United States Patent
Minamino et al.

(10) Patent No.: US 10,960,296 B2
(45) Date of Patent: Mar. 30, 2021

(54) INFORMATION PROCESSING APPARATUS AND OPERATION SIGNAL PROVIDING METHOD

(71) Applicant: Sony Interactive Entertainment inc., Tokyo (JP)

(72) Inventors: Takanori Minamino, Kanagawa (JP); Yoshiyuki Imada, Chiba (JP); Kenzo Nishikawa, Tokyo (JP); Dean Sofer, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 8 days.

(21) Appl. No.: 16/166,808

(22) Filed: Oct. 22, 2018

(65) Prior Publication Data

US 2019/0126136 A1 May 2, 2019

Related U.S. Application Data

(60) Provisional application No. 62/580,353, filed on Nov. 1, 2017.

(51) Int. Cl.
*A63F 13/211* (2014.01)
*A63F 13/5255* (2014.01)
(Continued)

(52) U.S. Cl.
CPC .......... *A63F 13/211* (2014.09); *A63F 13/219* (2014.09); *A63F 13/428* (2014.09);
(Continued)

(58) Field of Classification Search
CPC .. A63F 13/211; A63F 13/219; A63F 13/3255; G06F 3/0346
See application file for complete search history.

(56) References Cited

U.S. PATENT DOCUMENTS 8,622,833 B2   1/2014   Kake
8,781,151 B2   7/2014   Marks
(Continued)

FOREIGN PATENT DOCUMENTS

JP   2008011980 A   1/2008
JP   2008015679 A   1/2008
(Continued)

OTHER PUBLICATIONS

Killzone 3 Sharpshooter Move Demo Published Feb. 18, 2011 Updated by GameSpot https://www.youtube.com/watch?v=N7cYlCxbb6A (Year: 2011).*

(Continued)

*Primary Examiner* — Tramar Harper
*Assistant Examiner* — Jeffrey K Wong
(74) *Attorney, Agent, or Firm* — Matthew B. Dernier, Esq.

(57) ABSTRACT

Disclosed herein is an information processing apparatus that provides an operation signal of an input part of a controller to a game. The information processing apparatus includes an acquisition part configured to acquire a detected value of a motion of the controller, a conversion processing part configured to convert the acquired detected value to the operation signal of the input part of the controller, and an output processing part configured to provide the converted operation signal to the game.

7 Claims, 14 Drawing Sheets

(51) Int. Cl.

| | |
|---|---|
| *G06F 3/0346* | (2013.01) |
| *A63F 13/219* | (2014.01) |
| *A63F 13/837* | (2014.01) |
| *A63F 13/428* | (2014.01) |
| *A63F 13/98* | (2014.01) |

(52) U.S. Cl.
CPC ........ *A63F 13/5255* (2014.09); *A63F 13/837* (2014.09); *A63F 13/98* (2014.09); *G06F 3/0346* (2013.01)

(56) References Cited

U.S. PATENT DOCUMENTS

| | | | |
|---|---|---|---|
| 10,010,789 B2 | 7/2018 | Koizumi | |
| 2006/0250351 A1* | 11/2006 | Fu | A63F 13/06 345/156 |
| 2008/0009332 A1* | 1/2008 | Kake | A63F 13/211 463/7 |
| 2008/0080789 A1 | 4/2008 | Marks | |
| 2011/0263328 A1* | 10/2011 | Yamashita | A63F 13/213 463/36 |
| 2012/0289336 A1 | 11/2012 | Matsuda | |
| 2015/0234762 A1* | 8/2015 | Townsend | G06F 13/385 710/5 |
| 2016/0361641 A1 | 12/2016 | Koizumi | |
| 2017/0336882 A1* | 11/2017 | Tome | G06F 3/011 |

FOREIGN PATENT DOCUMENTS

| | | |
|---|---|---|
| JP | 2008246041 A | 10/2008 |
| JP | 2009535175 A | 10/2009 |
| JP | 2010531520 A | 9/2010 |
| JP | 2017004523 A | 1/2017 |
| WO | 2007130833 A2 | 11/2007 |

OTHER PUBLICATIONS

Socome 4: Playstation Move Sharp Shooter Published Feb. 10, 2011 Uploaded by sceablog https://www.youtube.com/watch?v=rXNrIAFjq88 (Year: 2011).*

KingGILLEY's Blog Possible Socom 4 Controller Layouts Feb. 1, 2011 http://kinggilley.blogspot.com/2011/02/possible-socom-4-controller-layouts.html (Year: 2011).*

Notification of Reason for Refusal for corresponding JP Application 2018-101620, 5 pages, dated May 21, 2019.

* cited by examiner

FIG.1
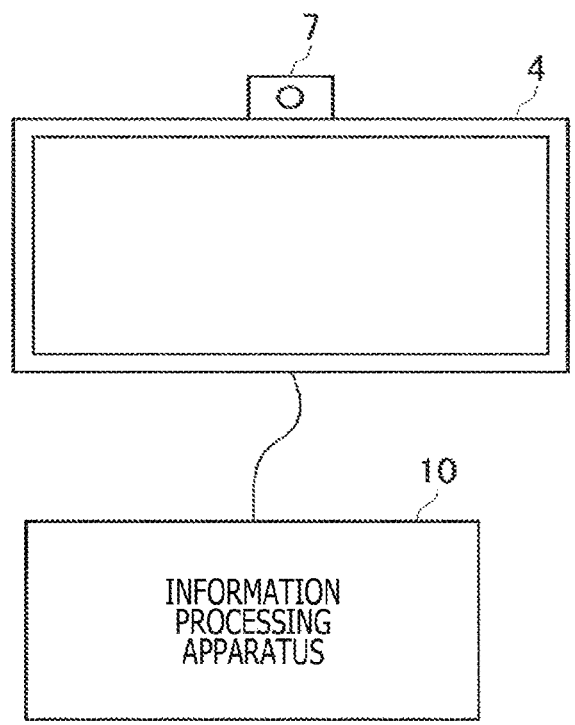
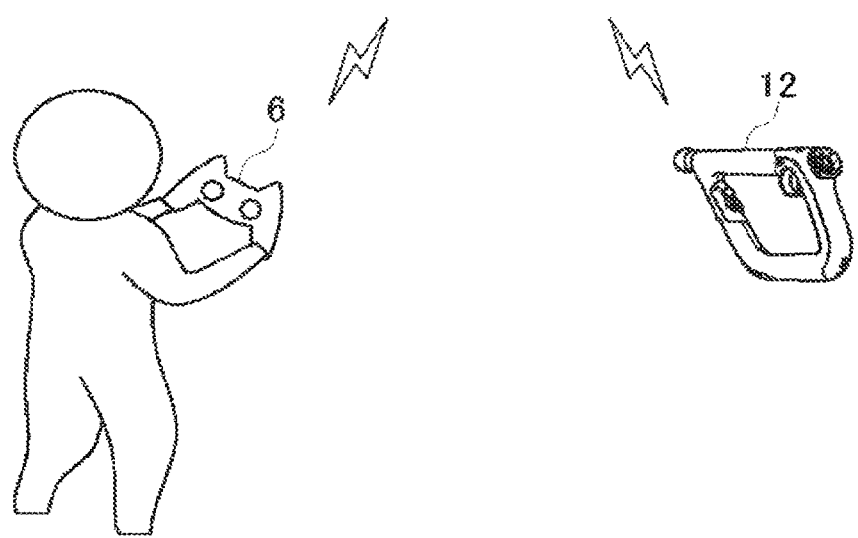

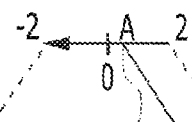
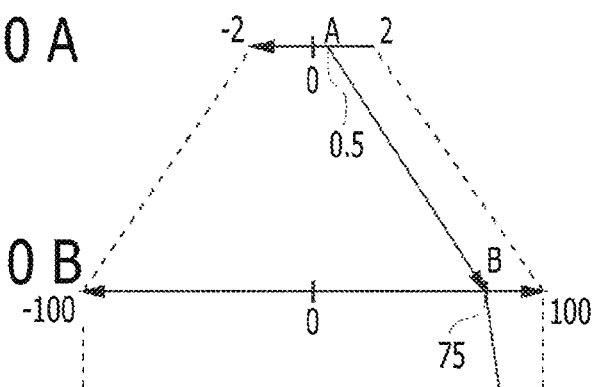
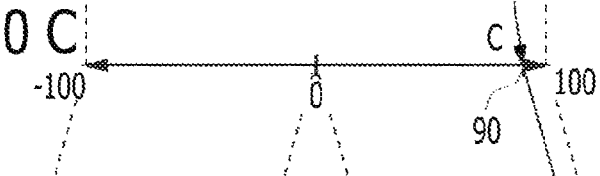
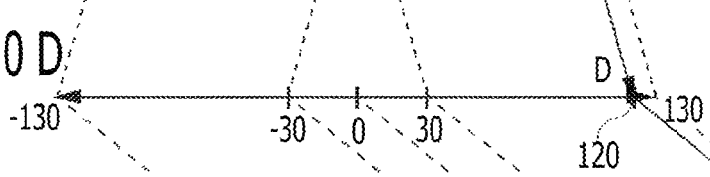

| | SIGNAL VALUE | SIGNAL VALUE TO WHICH PRECEDING ROUNDING ERROR IS ADDED | SIGNAL VALUE AFTER ROUNDING PROCESS | ROUNDING ERROR |
|---|---|---|---|---|
| N | 130.4 | 130.4 | 130 | 0.4 |
| N+1 | 125.3 | 125.7 | 126 | −0.3 |
| N+2 | 132.6 | 132.3 | 132 | 0.3 |
| N+3 | 113.4 | 113.7 | 114 | −0.3 |

FIG. 13

| NAME | MOTION | INPUT PARTS OF CONTROLLER | CHARACTER'S ACTION |
|---|---|---|---|
| ROTATE | ROLLING (FORWARD ROTATION DIRECTION) | SQUARE BUTTON | RELOAD |
| TILT_UP | PITCHING (FORWARD ROTATION DIRECTION) | TRIANGLE BUTTON | SWITCH WEAPONS |
| MOVE_UP | MOVEMENT ON YAW AXIS (POSITIVE DIRECTION) | CROSS BUTTON | JUMP |
| MOVE_FORWARD | MOVEMENT ON ROLL AXIS (NEGATIVE DIRECTION) | R3 BUTTON | CLOSE RANGE ATTACK |
| AIM | MOVEMENT ON YAW AXIS (POSITIVE DIRECTION) | L2 BUTTON | AIM WITH SCOPE |

200

FIG. 14
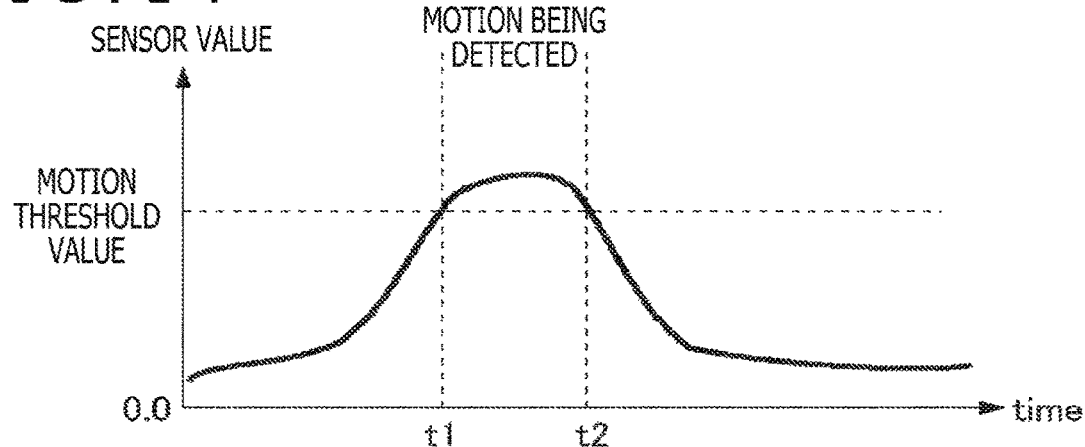
FIG. 15
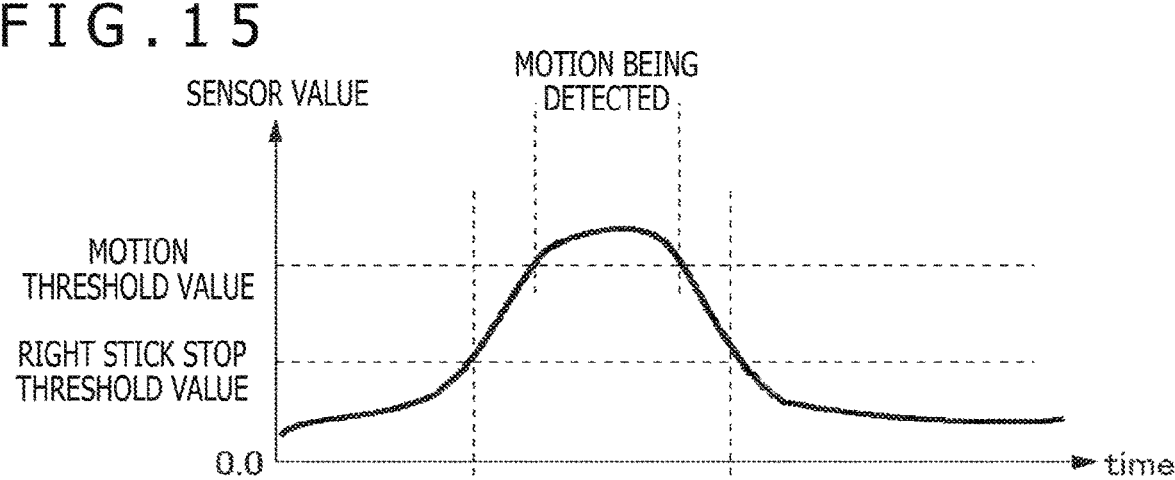
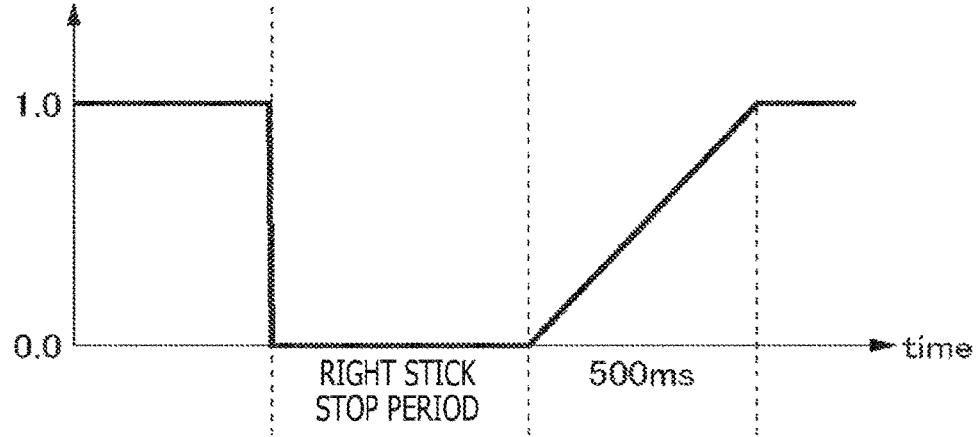

INFORMATION PROCESSING APPARATUS AND OPERATION SIGNAL PROVIDING METHOD

CROSS REFERENCE TO RELATED APPLICATIONS

This application claims the benefit of U.S. Provisional Patent Application No. 62/580,353, filed Nov. 1, 2017, the entire disclosure of which is hereby incorporated by reference.

BACKGROUND

The present disclosure relates to techniques for providing operation signals of an input apparatus to games.

Dedicated game machines receive operation signals from input parts of a game controller and provide the received signals to games. U.S. Patent Application Publication No. 2012/0289336 discloses a keyboard equipped with the functions of a game controller. The disclosed keyboard includes assigned keys to which the functions of the operation buttons on the game controller are assigned, a pointing stick, and attribute keys. With an attribute key being pressed, operating the pointing stick outputs operation signals of an analog stick of the game controller to the game.

SUMMARY

Recent years have seen the marketing of game controllers of special shapes for use in games of specific types. Typical of these game controllers is the gun controller for use in gun shooting games. Configured to process the operation signals of general-purpose game controllers, game software may not support the input signals of dedicated controllers such as the gun controller, which is basically handled as an optional device.

At present, if the game software does not support the input signals of a dedicated controller, users have no method of using that controller in games. Normally, dedicated controllers enable the user to perform intuitive operations. It is thus desired that an environment be provided in which the user can use a dedicated controller to play games that do not support such dedicated controllers.

It is desirable to provide an information processing apparatus that provides games with the operation signals of input parts of a general-purpose game controller, the information processing apparatus being configured to be usable in conjunction with dedicated controllers such as a gun controller.

According to an embodiment of the present disclosure, there is provided an information processing apparatus that provides an operation signal of an input part of a controller to a game. The information processing apparatus includes an acquisition part configured to acquire a detected value of a motion of the controller, a conversion processing part configured to convert the acquired detected value to the operation signal of the input part of the controller, and an output processing part configured to provide the converted operation signal to the game.

According to another embodiment of the present disclosure, there is provided an operation signal providing method for providing an operation signal of an input part of a controller to a game. The operation signal providing method includes acquiring a detected value of a motion of the controller, converting the acquired detected value to the operation signal of the input part of the controller, and providing the converted operation signal to the game.

Where other combinations of the above-outlined composing elements or the above expressions of the present disclosure are converted between different forms such as a method, an apparatus, a system, a recording medium, and a computer program, they still constitute effective embodiments of this disclosure.

The present disclosure thus provides an information processing apparatus that provides games with the operation signals of input parts of a general-purpose game controller, the information processing apparatus being configured to be usable in conjunction with dedicated controllers such as a gun controller.

BRIEF DESCRIPTION OF THE DRAWINGS

FIG. 1 is a schematic view depicting an information processing system as one embodiment;

FIGS. 10A, 10B, 10C, 10D, and 10E are schematic views explaining the process of converting motion sensor signals;

FIG. 13 is a tabular view depicting corresponding relations between motions of the second controller on the one hand and the input parts of the first controller on the other hand;

FIG. 14 is a graphic representation explaining the method of detecting a motion;

FIG. 15 is another graphic representation explaining the method of detecting a motion.

DETAILED DESCRIPTION OF THE PREFERRED EMBODIMENTS

Figure 2A:
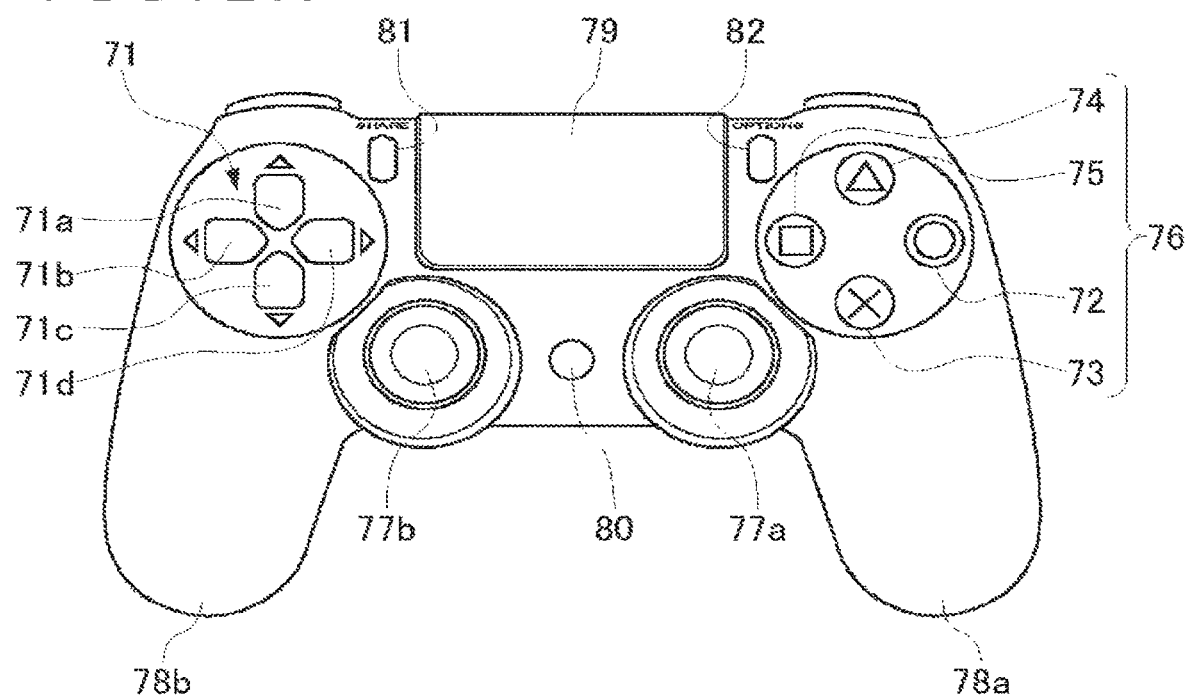
FIGS. 2A and 2B are a top view and a rear side view, respectively, of a first controller.

FIG. 1 depicts an information processing system 1 as one embodiment of the present disclosure. The information processing system 1 includes an information processing apparatus 10, an output apparatus 4 having a display function such as a television set, and a first controller 6 acting as an input apparatus. The information processing apparatus 10 is a game machine that executes game software and connected communicably with the first controller 6. In the example of FIG. 1, the information processing apparatus 10 is connected wirelessly with the first controller 6. Alternatively, the information processing apparatus 10 may be connected with the first controller 6 in wired fashion. A camera 7 acting as an imaging apparatus is provided near the output apparatus 4 and captures images of a space in front of the output apparatus 4.

The first controller 6 is a general-purpose game controller that transmits game operation signals to the information processing apparatus 10 when operated by a user. The first controller 6 includes multiple input parts such as various buttons and analog sticks. The information processing apparatus 10 receives game operation signals from the first controller 6 and provides the received signals to the game. In turn, the game has the game operation signals reflected in the actions of a game character in a game space.

The information processing system 1 further includes a second controller 12 acting as an input apparatus. The second controller 12 of this embodiment is a dedicated game controller (gun controller) for use in gun shooting games. The second controller 12 includes as many input parts as the first controller 6 as well as motion sensors. When the user operates the input parts of the second controller 12, the same game operation signals as those of the first controller 6 are output to the information processing apparatus 10. Thus the games executed by the information processing apparatus 10 processes the game operation signals from the second controller 12 with no problem.

The game software supporting the second controller 12 has the function of receiving the detected value of the motion sensors in the second controller 12 as a game operation signal. The function allows the user to input commands to the game by moving the second controller 12 or by changing its attitude. This, in conjunction with a special shape of the second controller 12, allows the user to perform intuitive operations that give the user a deeper sense of immersion in the game than the general-purpose first controller 6. When using the second controller 12, the user inputs commands by both moving the second controller 12 and operating its input parts to play the game through the intuitive operations.

Explained below are the input parts provided on the first controller 6.

[Configuration of the Top Side]

FIG. 2A is a top view of the first controller 6. The user operates the first controller 6 by gripping a left-side grip 78b with the left hand and a right-side grip 78a with the right hand. The top side of the enclosure of the first controller 6 is equipped with arrow buttons 71, analog sticks 77a and 77b, and operation buttons 76. The arrow buttons 71 include an upward button 71a, a leftward button 71b, a downward button 71c, and a rightward button 71d. There are four kinds of operation buttons 76 each marked with a different pictorial figure in a different color for identification purposes. Of the operation buttons 76, a circle button 72 is marked with a red circle, a cross button 73 with a blue cross, a square button 74 with a purple square, and a triangle button 75 with a green triangle.

The right analog stick 77a and the left analog stick 77b are input parts configured to input directions and tilting amounts. The right analog stick 77a and the left analog stick 77b also function as a depressable button each; they are depressed when pushed by the user and return to their initial positions when released. The right analog stick 77a, when depressed to execute its button function, is called the R3 button; the left analog stick 77b, when depressed to execute its button function, is called the L3 button. A touch pad 79 is provided in a flat area between the arrow buttons 71 and the operation buttons 76 on the top side of the enclosure. The touch pad 79 also functions as a depressable button, depressed when pushed by the user and returning to its initial position when released.

A home button 80 is provided between the right analog stick 77a and the left analog stick 77b. The home button 80 is used to turn on the power supply of the first controller 6 and to activate its communication function for wireless connection with the information processing apparatus 10 at the same time. After the first controller 6 is connected with the information processing apparatus 10, the home button 80 is also used to display menu screens on the output apparatus 4.

A SHARE button 81 is provided on the left of the touch pad 79. The SHARE button 81 is used to input the user's instructions to system software. An OPTIONS button 82 is provided on the right of the touch pad 79. The OPTIONS button 82 is used to input the user's instructions to the game. The SHARE button 81 and the OPTIONS button 82 may each be formed as a pushbutton.

[Configuration of the Rear Side]

Figure 2B:
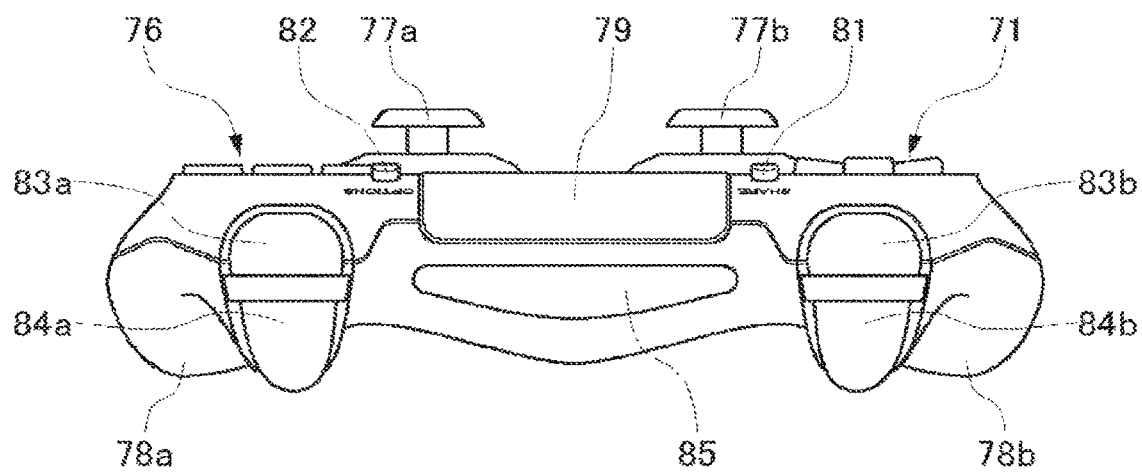

FIG. 2B is a rear side view of the first controller 6. The touch pad 79 extending from the enclosure top is bent onto an upper portion of the rear side of the first controller 6. At a lower portion of the rear side of the enclosure is a horizontally elongated light-emitting part 85. The light-emitting part 85 includes light-emitting diodes (LEDs) emitting light in three colors: red (R), green (G), and blue (B). The light-emitting part 85 is lit in accordance with emitted-light color information sent from the information processing apparatus 10. On the rear side of the enclosure, an R1 button 83a and an R2 button 84a are provided in longitudinally symmetrical relation to an L1 button 83b and an L2 button 84b. The R1 button 83a and the R2 button 84a are operated by the index finger and the middle finger of the user's right hand, respectively. The L1 button 83b and the L2 button 84b are operated by the index finger and the middle finger of the user's left hand, respectively. The R1 button 83a and the L1 button 83b positioned above the other buttons may be configured as a pushbutton each. The R2 button 84a and the L2 button 84b positioned below the other buttons may be configured as a pivotally supported trigger button each.

Figure 3:
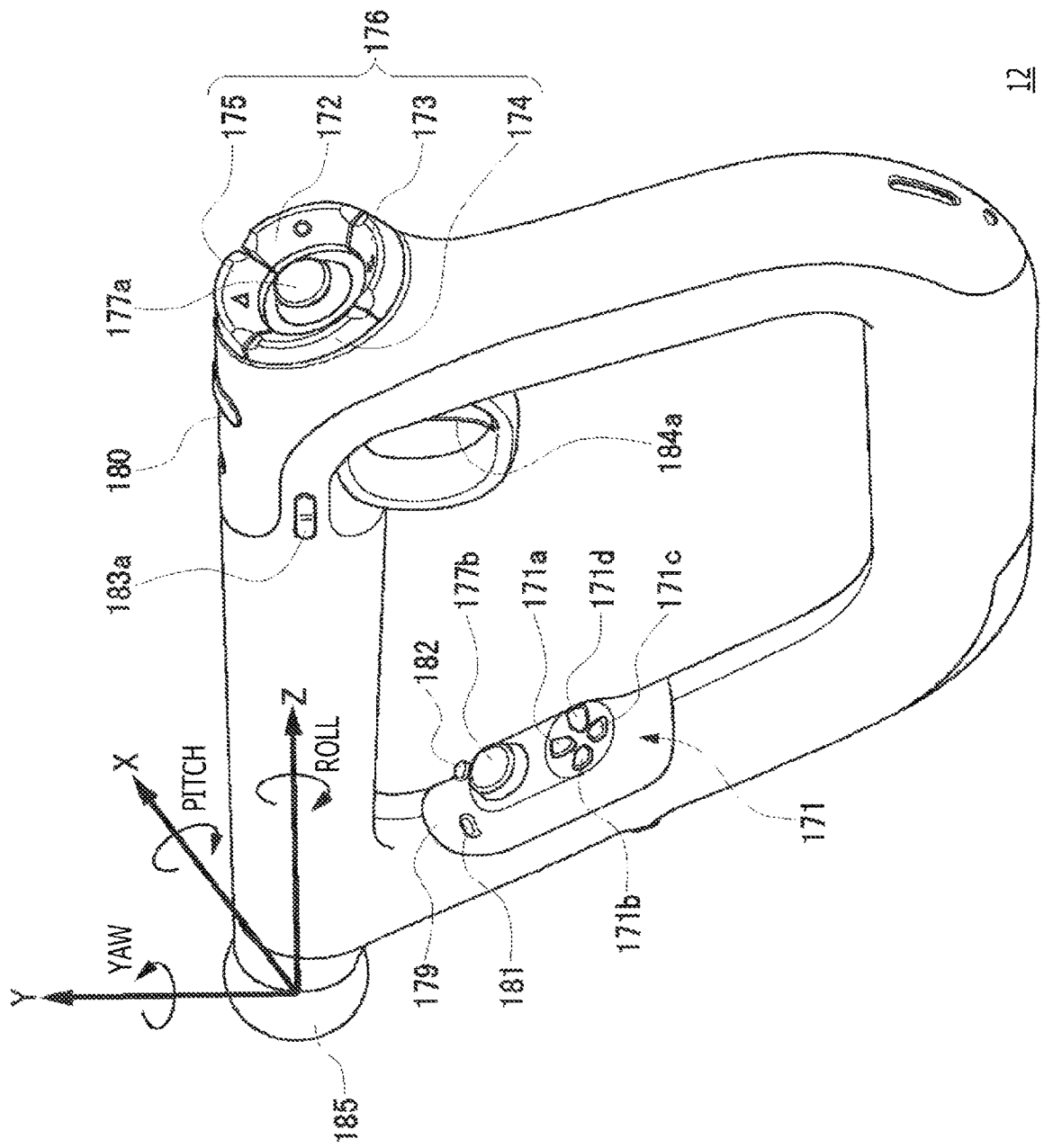
FIG. 3 is a perspective view of a second controller.

FIG. 3 is a perspective view of the second controller 12. In this embodiment, the three-dimensional coordinates of the second controller 12 are set as illustrated, with the X axis used as a pitch axis, the Y axis as a yaw axis, and the Z axis as a roll axis. The second controller 12 for gun shooting games basically possesses all input parts of the general-purpose first controller 6. This allows the user to perform those input operations on the second controller 12 that are also carried out on the first controller 6.

Referring to FIGS. 2A and 2B, a circle button 172, a cross button 173, a square button 174, and a triangle button 175 included in operation buttons 176 correspond respectively to the circle button 72, cross button 73, square button 74, and triangle button 75 included in the operation buttons 76. Also, an upward button 171a, a leftward button 171b, a downward button 171c, and a rightward button 171d included in arrow buttons 171 correspond respectively to the upward button 71a, leftward button 71b, downward button 71c, and rightward button 71d included in the arrow buttons 71. A touch pad 179 corresponds to the touch pad 79, a home button 180 to the home button 80, a SHARE button 181 to the SHARE button 81, an OPTIONS button 182 to the OPTIONS button 82, an R1 button 183a to the R1 button 83a, and an R2 button 184a to the R2 button 84a. Analog sticks 177a and 177b correspond to the right analog stick 77a and the left analog stick 77b, respectively. A light-emitting part 185 emitting light in a desired color is provided at the tip of the second controller 12.

The second controller 12 is shaped to resemble a gun. For example, in first person shooter (FPS) games, the user can fire the gun by pulling the R2 button 184a configured as a trigger switch. Intuitive operations using the second controller 12 as a gun controller allow the user to have a deeper sense of immersion in gun shooting games.

Figure 4:
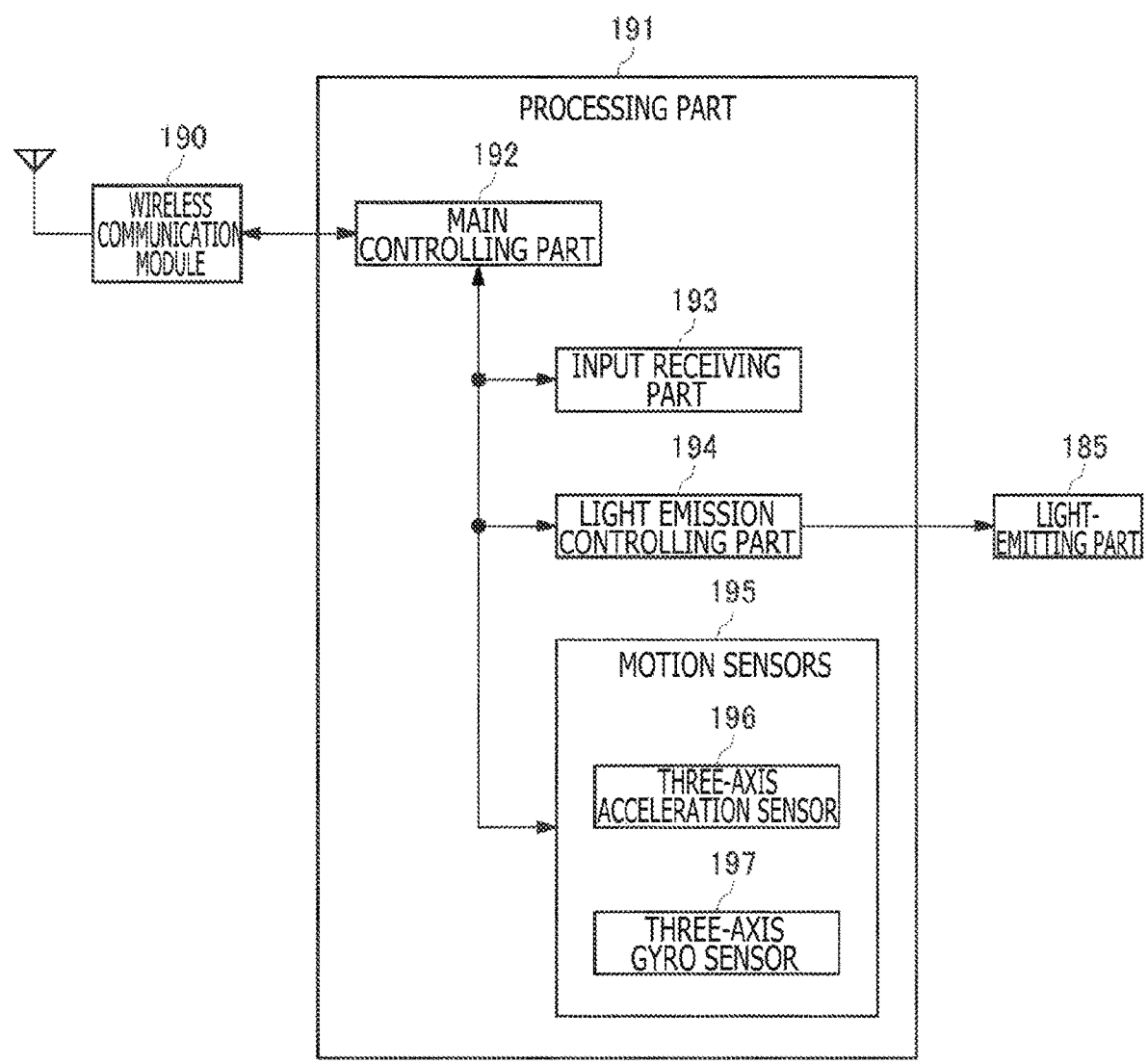
FIG. 4 is a block diagram depicting an internal configuration of the second controller.

FIG. 4 depicts an internal configuration of the second controller 12. The second controller 12 includes a wireless communication module 190, a processing part 191, and the light-emitting part 185. The wireless communication module 190 has the function of transmitting and receiving data to and from a wireless communication module of the information processing apparatus 10. The processing part 191 includes a main controlling part 192, an input receiving part 193, a light emission controlling part 194, and motion sensors 195, and performs predetermined processes of the second controller 12. The main controlling part 192 transmits and receives necessary data to and from the wireless communication module 190.

The input receiving part 193 receives operation signals from various input parts such as the arrow buttons 171 and operation buttons 176, and forwards the received signals to the main controlling part 192. The main controlling part 192 supplies the received operation signals to the wireless communication module 190. The wires communication module 190 transmits the supplied signals to the information processing apparatus 10 in a predetermined cycle. Incidentally, the main controlling part 192 may convert the received operation signals to predetermined control signals as needed.

The light emission controlling part 194 controls the emission of light by the light-emitting part 185. For example, when the information processing apparatus 10 transmits the emitted-light color information designating the color of light to be emitted by the light-emitting part 185, the light emission controlling part 194 may cause the light-emitting part 185 to emit light in the designated color.

The motion sensors 195 including a three-axis acceleration sensor 196 and a three-axis gyro sensor 197 detect motions of the second controller 12. The three-axis acceleration sensor 196 detects acceleration components in the X, Y, and Z axis directions of the second controller 12. The three-axis gyro sensor 197 detects angular velocities around the X, Y, and Z axes. The main controlling part 192 receives detected value signals from the three-axis acceleration sensor 196 and three-axis gyro sensor 197. The wireless communication module 190 transmits the detected value signals (sensor signals) along with the operation signals from the input parts to the information processing apparatus 10 in a predetermined cycle.

Figure 5:
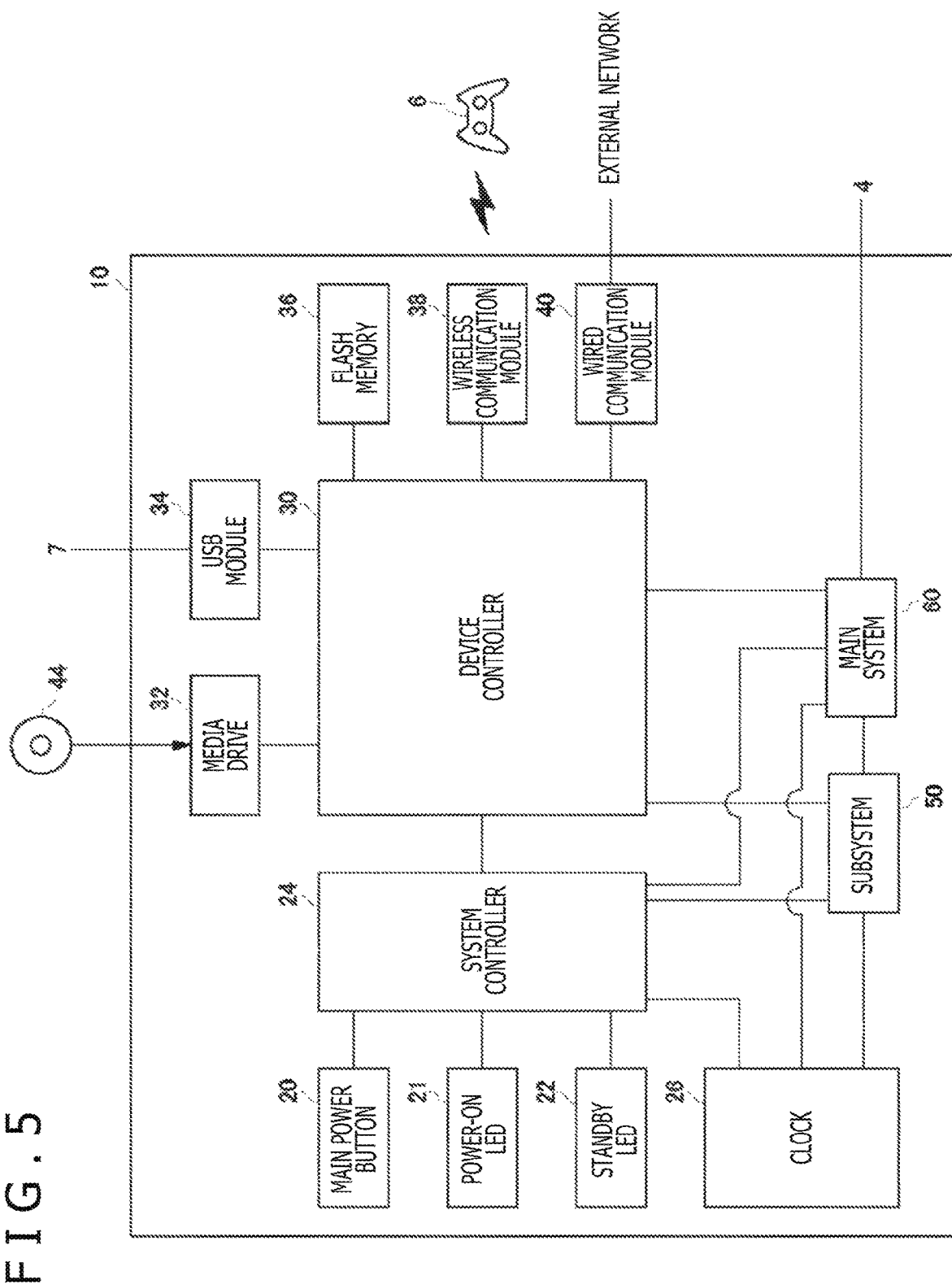
FIG. 5 is a functional block diagram of an information processing apparatus.

FIG. 5 depicts functional blocks of the information processing apparatus 10. The information processing apparatus 10 includes a main power button 20, a power-on LED 21, a standby LED 22, a system controller 24, a clock 26, a device controller 30, a media drive 32, a universal serial bus (USB) module 34, a flash memory 36, a wireless communication module 38, a wired communication module 40, a subsystem 50, and a main system 60.

The main system 60 includes a main central processing unit (CPU), a memory and a memory controller constituting a main storage apparatus, a graphics processing unit (GPU), and the like. The GPU is used mainly for arithmetic processing of game programs. These functions may be implemented as a system-on chip on a single chip. The main CPU has the function of activating system software and executing games in an environment provided by the system software.

The subsystem 50 includes a sub CPU, and a memory and a memory controller constituting a main storage apparatus, but does not have a GPU. The sub CPU operates when the main CPU is in standby mode. The processing functions of the sub CPU are limited in order to minimize power consumption.

The main power button 20 is provided on the front of the enclosure of the information processing apparatus 10. The main power button 20 is operated to turn on or off the supply of power to the main system 60. The power-on LED 21 is lit when the main power button 20 is switched on. The standby LED 22 is lit when the main power button 20 is switched off.

The system controller 24 detects whether the main power button 20 is pressed by the user. The clock 26 is a real-time clock that generates current date and time information and supplies the generated information to the system controller 24, subsystem 50, and main system 60.

The device controller 30 is configured as a large-scale integrated circuit (LSI) that performs information transfers between devices in a manner similar to the Southbridge. As illustrated, the device controller 30 is connected with such devices as the system controller 24, media drive 32, USB module 34, flash memory 36, wireless communication module 38, wired communication module 40, subsystem 50, and main system 60. The device controller 30 controls the timing of data transfers by absorbing differences in electrical characteristics and data transfer rates between the devices.

The media drive 32 as a drive apparatus is loaded with read-only memory (ROM) media 44 on which application software such as games and their license information are recorded. The media drive 32 drives the loaded ROM media 44 to read programs and data therefrom. The ROM media 44 constitute read-only recording media such as optical disks, magneto-optical disks, and Blu-ray discs.

The USB module 34 is connected with an external device such as the camera 7 via a USB cable. The flash memory 36 is an auxiliary storage apparatus that constitutes internal storage. The wireless communication module 38 communicates wirelessly with the first controller 6 and with the second controller 12 under a communication protocol such as the Bluetooth (registered trademark) protocol or the IEEE 802.11 protocol. The wired communication module 40 communicates in wired fashion with an external device and is connected with a network via an access point (AP), for example.

In this embodiment, the information processing apparatus 10 is a dedicated game machine whereas the first controller 6 is a general-purpose game controller. All games performed by the dedicated game machine are configured to run on the game operation signals from the first controller 6. As described above, all games are designed to run on the game operation signals generated by the user operating the input parts of the second controller 12.

On the other hand, the major purpose for which the user uses the second controller 12 is to input commands intuitively by moving the second controller 12 or by changing its attitude. It follows that there is little meaning for the user to use the second controller 12 if game software is incapable of processing the detected values of the motion sensors 195. Obviously, the game software that was produced before the marketing of the second controller 12 is not predicated on the use of the second controller 12 and is thus often deprived of the capability to process the detected values of the motion sensors 195. In view of this, the information processing apparatus 10 of this embodiment provides a scheme for converting the motion sensor signals of the second controller 12 into game operation signals so that games not supporting the second controller 12 may also be played by the user operating the second controller 12.

Figure 6:
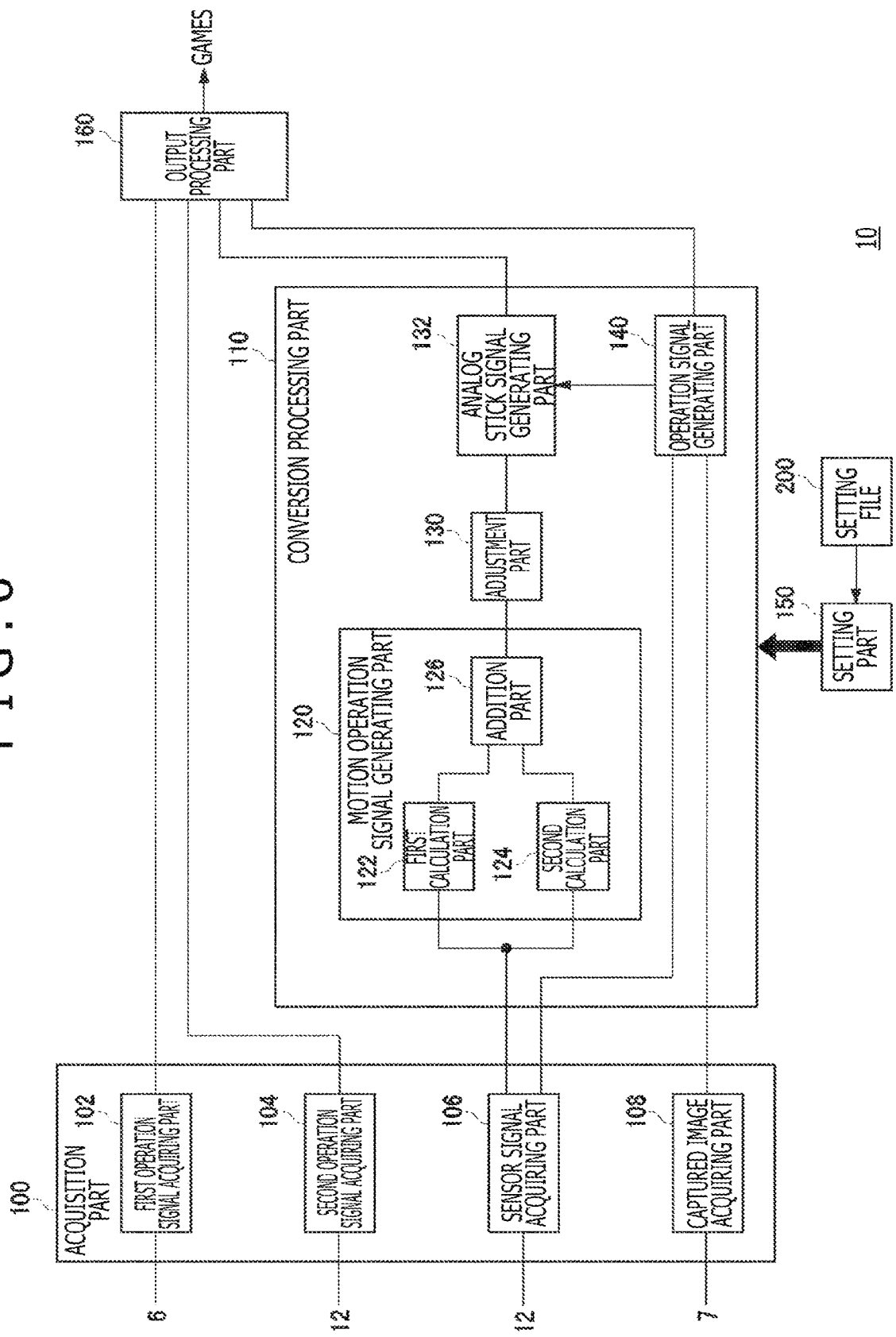
FIG. 6 is a block diagram depicting a configuration of the information processing apparatus.

FIG. 6 depicts a configuration of the information processing apparatus 10 that provides the operation signals of the first controller 6 to the game. The information processing apparatus 10 includes an acquisition part 100, a conversion processing part 110, a setting part 150, and an output processing part 160. The acquisition part 100 includes a first operation signal acquiring part 102 that acquires operation signals from the input parts of the first controller 6, a second operation signal acquiring part 104 that acquires operation signals from the input parts of the second controller 12, a sensor signal acquiring part 106 that acquires detected value signals of the motion sensors 195 of the second controller 12, and a captured image acquiring part 108 that acquires images captured by the camera 7. The conversion processing part 110 has the function of converting the detected values of the motion sensors 195 of the second controller 12 into operation signals of the input parts of the first controller 6, the converted operation signals being supplied to games that are incapable of processing the detected values of the motion sensors 195. The conversion processing part 110 includes a motion operation signal generating part 120, an adjustment part 130, an analog stick signal generating part 132, and an operation signal generating part 140.

The elements depicted in FIG. 6 as the functional blocks configured to perform various processes may be implemented either in a hardware configuration that includes circuit blocks, memories, and other LSIs, or in software such as the system software loaded into a memory. Thus it will be understood by those skilled in the art that these functional blocks are realized in hardware alone, in software alone, or by a combination of both in diverse forms and are not limited to any of such forms.

The first operation signal acquiring part 102 acquires the operation signals of the input parts of the first controller 6 and supplies the acquired signals to the output processing part 160. The output processing part 160 provides the operation signals of the input parts of the first controller 6 to the game. Also, the second operation signal acquiring part 104 acquires the operation signals of the input parts of the second controller 12 and supplies the acquired signals to the output processing part 160. The output processing part 160 provides the operation signals of the input parts of the second controller 12 to the game. The game is capable of processing the operation signals of the input parts of the controllers.

In FPS games, the right analog stick 77a of the first controller 6 and the analog stick 177a of the second controller 12 (both sticks are generically referred to as "the right analog stick 77a" hereunder) are used to manipulate the viewpoint of the game character. The right analog stick 77a is actuated by springs or the like to maintain its center position. When tiled by the user from its center position, the right analog stick 77a outputs an analog value indicative of the two-dimensional position reached by the tilt, i.e., an operation signal indicative of displacements of the X and Y axis components relative to the center position regarded as the origin. The X axis component is used for moving the viewpoint in the horizontal direction, and the Y axis component for moving the viewpoint in the vertical direction. The output processing part 160 performs the process of rounding the operation signals from the right analog stick 77a so as to generate operation signals of the X and Y axis components in an eight-bit digital value each, before providing the signals to the game.

Figure 7A:
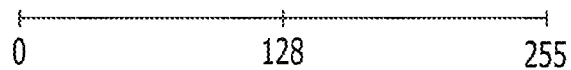
FIGS. 7A, 7B, and 7C are schematic views depicting output ranges of a right analog stick.

FIG. 7A depicts the output range of a single axis component of the right analog stick 77a. The output processing part 160 performs the process of rounding each axis component of the operation signals of the right analog stick 77a, outputting the X and Y axis components in integer values each ranging from 0 to 255.

Figure 7B:
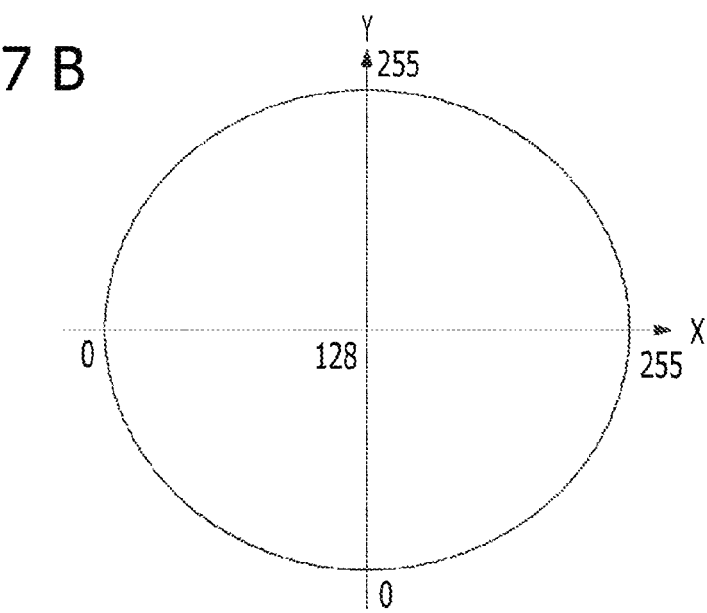

FIG. 7B depicts the output range of the X and Y axis components of the right analog stick 77a. When the right analog stick 77a is at its center position, the output processing part 160 provides the game with the operation signals in which the signal value of the X axis component is 128 and that of the Y axis component is 128.

Games do not necessarily accept the entire output range of the right analog stick 77a as valid input. Many games ignore signal values from a dead zone set to absorb stick operations near the center position of the stick. One reason for setting the dead zone is that the accuracy of a position sensor attached to the right analog stick 77a is not very high. It is therefore difficult to deny the possibility that even with the user not in contact with the right analog stick 77a, there may occur an operation signal indicative of the stick being off the center position (128, 128). Another reason is that the user placing the right thumb on the tip of the right analog stick 77a may unintentionally move the stick due to a trembling thumb, for example. The game is thus arranged to set the dead zone absorbing inadvertent operations on the right analog stick 77a near its center position. The operations exceeding the dead zone are accepted by the game as valid viewpoint manipulation input.

Figure 7C:
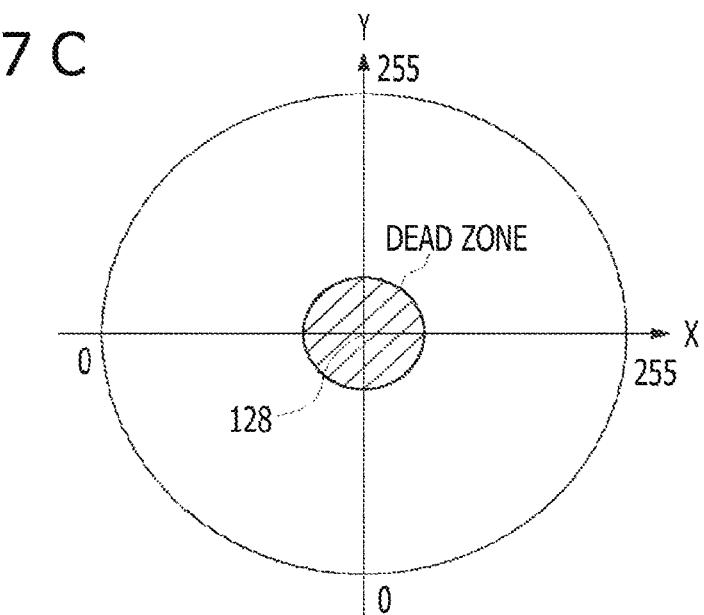

FIG. 7C depicts a typical dead zone set by the game regarding the output range of the right analog stick 77a. In this example, the dead zone is set as a circular range with a predetermined radius centering on the center position (128, 128). The game is allowed to set the dead zone as desired. For example, a rectangular range centering on the center position may be set. The game ignores operation signals stemming from the dead zone; these operation signals are not reflected in the processing of the game.

When the user moves the second controller 12 to manipulate the viewpoint, the information processing apparatus 10 of this embodiment performs the process of converting the motion into viewpoint manipulation input, i.e., into operation input for the right analog stick 77a. When the user moves (i.e., gives a motion to) the second controller 12 for an action other than viewpoint manipulation, the information processing apparatus 10 performs the process of also converting the motion into game operation input. Incidentally, the second controller 12 is equipped with the input parts similar to those of the first controller 6. The user can perform input operations on the game by operating these input parts. In this embodiment, the information processing apparatus 10 supports intuitive operation input performed by the user moving the second controller 12.

In order to use the movement (motions) of the second controller 12 as the game operation input, the information processing apparatus 10 acquires from an external server a setting file 200 that describes data for converting the motions of the second controller 12 into operation signals of the first controller 6. If the setting file 200 is included in the game software, the information processing apparatus 10 acquires that setting file 200 from the game software. The setting file 200 describes sensitivity adjustment values, data constituting a conversion curve for converting motion operation signals into operation signals of the right analog stick 77a, data regarding the output dead zone, motion threshold values for detecting predetermined motions, stop threshold values for stopping the conversion of motion operation signals to operation signals of the right analog stick 77a, and motion priorities.

<Process of Conversion to Right Analog Stick Signals>

Explained first is the process performed by the information processing apparatus 10 to generate operation signals of the right analog stick 77a using detected values of the motion sensors 195 on the second controller 12. Basically, the information processing apparatus 10 generates the output of the X axis component of the right analog stick 77a (for use in horizontal viewpoint manipulation) using the angular velocity around the yaw axis out of the detected values of the three-axis gyro sensor 197. The information processing apparatus 10 also generates the output of the Y axis component of the right analog stick 77a (for use in vertical viewpoint manipulation) using the angular velocity around the pitch axis. In generating the X axis component of the right analog stick 77a, the information processing apparatus 10 further uses the angular velocity around the yaw axis or the acceleration in the pitch axis direction.

Figure 8:
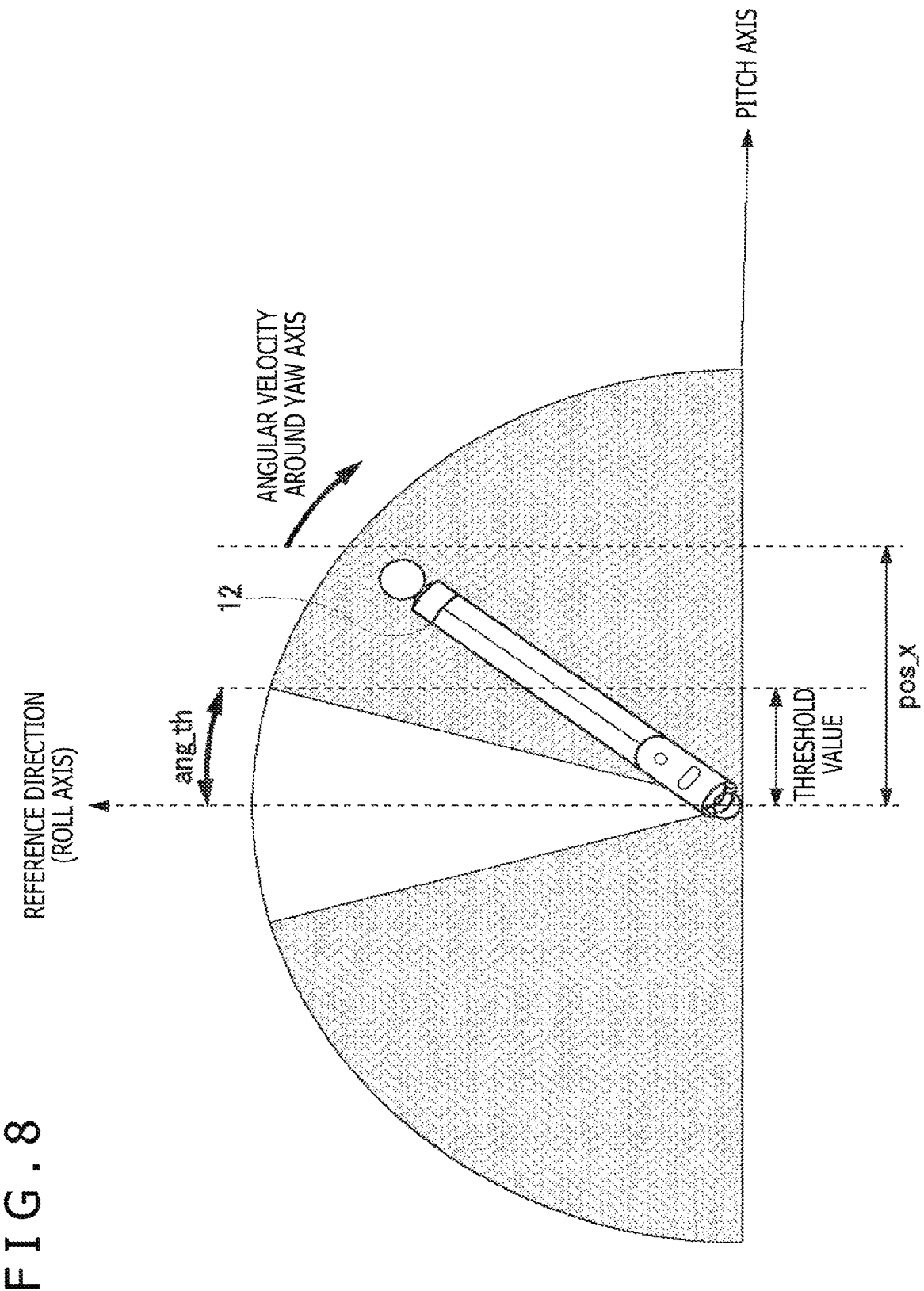
FIG. 8 is a schematic view explaining a method of generating a motion operation signal.

FIG. 8 is a schematic view explaining a method of generating a motion operation signal for conversion to a right analog stick signal on the basis of detected values of the motion sensors 195. FIG. 8 illustrates the method of generating the X axis component of the motion operation signal for conversion to the X axis component of the right analog stick 77a. In order to generate the motion operation signal, the user needs to set a reference direction of the second controller 12. For example, the user may set the reference direction by operating a predetermined button while pointing the second controller 12 at the output apparatus 4.

The motion operation signal generating part 120 includes a first calculation part 122, a second calculation part 124, and an addition part 126. At the time of generating the X axis component of the motion operation signal, the first calculation part 122 and the second calculation part 124 are both active. On the other hand, upon generation of the Y axis component of the motion operation signal, the second calculation part 124 remains inactive. The reason for this will be discussed later.

The sensor signal acquiring part 106 acquires detected values of the motion sensors 195 mounted on the second controller 12, and supplies the acquired values to the motion operation signal generating part 120. The motion operation signal generating part 120 performs the process of generating the X axis component of the motion operation signal for conversion to the X axis component of the right analog stick 77a using the angular velocity around the yaw axis.

The first calculation part 122 calculates a first signal (x1) from the angular velocity around the yaw axis detected by the three-axis gyro sensor 197. Here, the first calculation part 122 calculates the first signal (x1) using the angular velocity (wy) around the Y axis, i.e., around the yaw axis as follows:

$$x1 = \omega y \times \text{sensitivity}$$

where, the sensitivity (sensitivity adjustment value) is set appropriately in accordance with the detection sensitivity of the three-axis gyro sensor 197.

Apart from the first calculation part 122, the second calculation part 124 calculates a second signal (x2) corresponding to the amount of divergence between the direction in which the second controller 12 is oriented and the reference direction. Here, the second calculation part 124 calculates the second signal (x2) on condition that the direction in which the second controller 12 is oriented is diverted from the reference direction by more than a predetermined angle threshold (ang_th), as follows:

when pos_x>0, $$x2 = \text{scale} \times (pos\_x - \text{threshold value})$$

when pos_x<0, $$x2 = \text{scale} \times (pos\_x + \text{threshold value})$$

where, it is assumed that the radius of the semicircle depicted in FIG. 8 is equal to the total length L of the second controller 12. The value of "scale" is a coefficient for adjusting the sensitivity. The threshold value is a length along the pitch axis determined by the angle threshold (ang_th). The threshold value is obtained by L×sin(ang_th).

The second calculation part 124 may calculate the second signal by computing the displacement in the pitch axis direction (pos_x) either through the use of an integral value of the angular velocity around the yaw axis detected by the motion sensors 195 or through integration of the acceleration in the pitch axis direction. The addition part 126 generates the X axis component of the motion operation signal in which the first signal (x1) and the second signal (x2) are added up, and outputs the generated X axis component to the adjustment part 130.

The second calculation part 124 calculates the second signal in the case where the amount of divergence (amount of displacement) between the direction in which the second controller 12 is oriented and the reference direction exceeds the angle threshold (ang_th). Thus if the amount of divergence does not exceed the angle threshold (ang_th), the second calculation part 124 outputs a zero value. The addition part 126 outputs the first signal to the adjustment part 130 as the motion operation signal. In this case, the X axis component of the right analog stick 77a is defined by the first signal (x1), i.e., by the magnitude of the angular velocity around the yaw axis.

In the case where the amount of divergence (amount of displacement) exceeds the angle threshold (ang_th), the second calculation part 124 calculates the second signal. This allows the addition part 126 to output a non-zero motion operation signal to the adjustment part 130 even in the case where the second controller 12 is at rest (i.e., where the angular velocity around the yaw axis is zero, with the first signal taking on a zero value). This causes the game to rotate the viewpoint direction of the game character around the yaw axis, allowing the user to check the status of the surroundings. The above explanation is about the X axis component of the motion operation signal for conversion to the X axis component of the right analog stick 77a.

Explained next is how to generate the Y axis component of the motion operation signal for conversion to the Y axis component of the right analog stick 77a. The motion operation signal generating part 120 performs the process of generating the Y axis component of the motion operation signal for conversion to the Y axis component of the right analog stick 77a using the angular velocity around the pitch axis.

The first calculation part 122 calculates a first signal (y1) from the angular velocity around the pitch axis detected by the three-axis gyro sensor 197. Here, the first calculation part 122 calculates the first signal (y1) using the angular velocity (ωx) around the X axis, i.e., around the pitch axis, as follows:

$$y1 = \omega x \times \text{sensitivity}$$

where, the sensitivity (sensitivity adjustment value) is set appropriately in accordance with the detection sensitivity of the three-axis gyro sensor 197.

As described above, at the time of generating the Y axis component of the motion operation signal, the second calculation part 124 remains inactive. Although the Y axis component of the right analog stick 77a is used for vertical viewpoint manipulation, there are few occasions on which the user wants to consecutively rotate the viewpoint direction around the pitch axis during the game. There also exists a large amount of divergence between the viewpoint movement in the real world and that in the virtual world. Thus the second calculation part 124 of this embodiment is configured to calculate the second signal to be reflected in the X axis component of the analog stick signal while not calculating the second signal to be reflected in the Y axis component of the analog stick signal.

As described above, the motion operation signal generating part 120 generates the X and Y axis components of the motion operation signals corresponding to the X and Y axis components of the analog stick signal, and outputs the generated components to the adjustment part 130.

Figure 9:
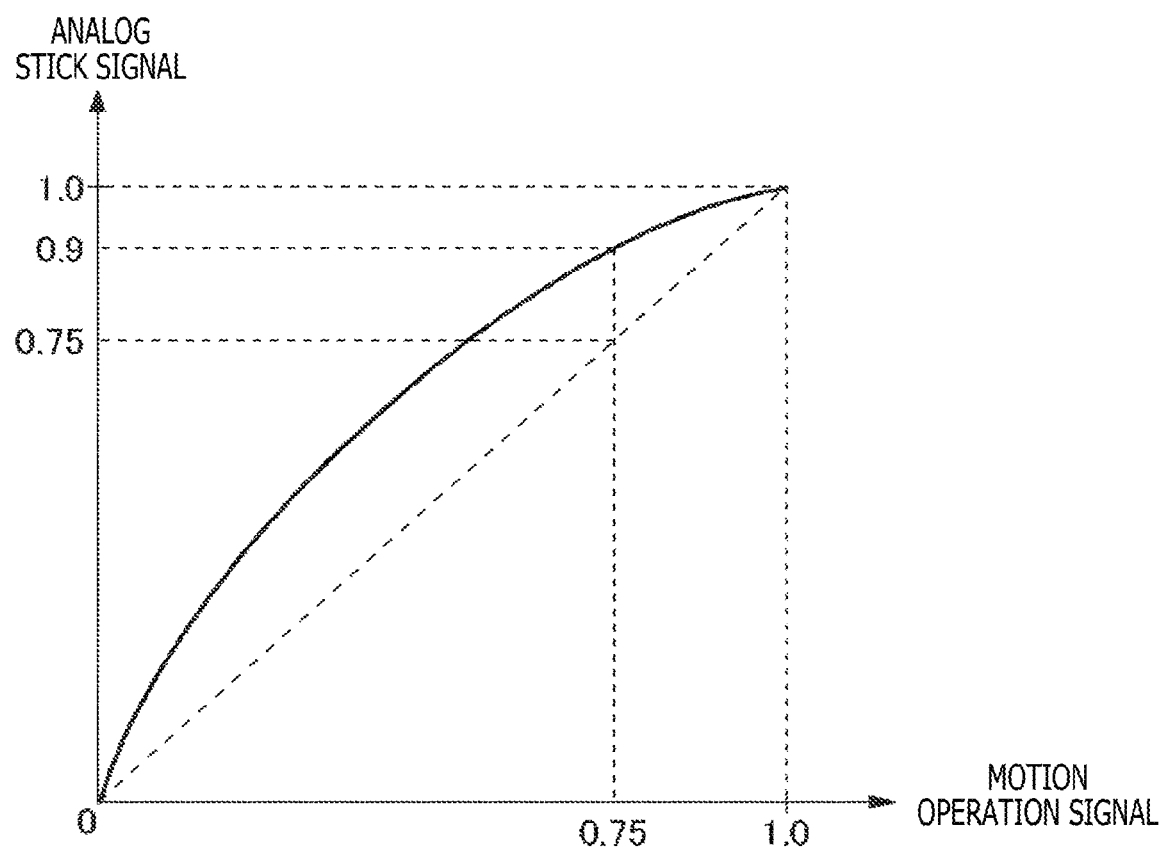
FIG. 9 is a graphic representation illustrating a typical conversion curve.

FIG. 9 depicts a typical conversion curve for converting a motion operation signal to a right analog stick operation signal. The horizontal axis of this conversion curve denotes the motion operation signal of the second controller 12. A signal value of 1.0 represents a signal value applicable when the motion operation signal (x1+x2) calculated by the addition part 126 is equal to or larger than a predetermined value. The vertical axis of the conversion curve represents the operation signal of the right analog stick 77a. A right analog stick signal of 1.0 denotes a maximum tilting amount.

When the signal value of the motion operation signal is, for example, 0.75 on this conversion curve, the operation signal of the right analog stick 77a is set to 0.9. If "(right analog stick signal)/(motion operation signal)" is defined as an amplification factor, the conversion curve defines the amplification factor of the right analog stick signal with respect to the normalized motion operation signal.

The setting part 150 acquires the setting file 200 corresponding to the game and provides the acquired file 200 to the conversion processing part 110. When the game software is started, the setting part 150 may preferably acquire the setting file 200 automatically from an external server or from the game software and provide the acquired file to the conversion processing part 110.

The second controller 12 transmits the detected values of the motion sensors 195 to the information processing apparatus 10 in a predetermined cycle. The transmission cycle of the second controller 12 is set to be shorter than the cycle in which the game generates game screens (e.g., 60 fps). The sensor signal acquiring part 106 acquires sensor signals that are output in a predetermined cycle and supplies the acquired signals to the conversion processing part 110. The conversion processing part 110 converts the sensor signals to operation signals of the input parts including the right analog stick 77a. The output processing part 160 provides the converted operation signals to the game.

FIGS. 10A to 10E are schematic views explaining the process performed by the conversion processing part 110 to convert motion sensor signals.

FIG. 10A depicts the range of a gyro sensor signal. The motion operation signal generating part 120 generates the first signal using the gyro sensor signal. Incidentally, the X axis component of the motion operation signal is generated by adding the second signal calculated by the second calculation part 124, as described above. In FIG. 10A, the value "2" indicated as a delimiter of the range represents a provisional maximum value of the gyro sensor signal given while the user is playing the game. This does not mean that the maximum value of the gyro sensor signal is limited to 2. Explained below is a typical flow in which the conversion processing part 110 converts a gyro sensor signal value A (=0.5) to a signal value E of the right analog stick 77a.

The sensor signal acquiring part 106 supplies the sensor signal value to the motion operation signal generating part 120. The motion operation signal generating part 120 generates a motion operation signal using the sensor signal value. In order to eliminate the effect of vibrations from a trembling hand, the motion operation signal generating part 120 may set a predetermined range of signal values of the gyro sensor signal (e.g., between −0.016 and 0.016) to zero before generating the motion operation signal.

FIG. 10B depicts the range of the axis components of the motion operation signal. The motion operation signal generating part 120 adjusts sensitivity using a sensitivity adjustment value (sensitivity, scale) included in the setting file 200 so as to generate the motion operation signal (x1+x2). Here, a motion operation signal value B (=75) is calculated from the gyro sensor signal value A (=0.5) and supplied to the adjustment part 130.

The adjustment part 130 applies the conversion curve to the motion operation signal.

FIG. 10C depicts how the conversion curve is applied. The adjustment part 130 multiplies the motion operation signal by the amplification factor defined by the conversion curve illustrated in FIG. 9. If it is assumed that the amplification factor for the sensitivity-adjusted signal value of 75 is 1.2 on the conversion curve in FIG. 9, the adjustment part 130 multiplies the signal value B by 1.2 for conversion to a signal value C (=90).

The adjustment part 130 adds a signal portion corresponding to the dead zone set on the right analog stick 77a to the motion operation signal to which the conversion curve is applied. The adjustment part 130 prevents the motion operation signal from manifesting a dead-zone-related signal value by adding the signal portion corresponding to the dead zone to the motion operation signal. Incidentally, the signal portion corresponding to the dead zone may be set in accordance with the signal value following the application of the conversion curve. Specifically, the signal portion corresponding to the dead zone may be set to be small for small signal values for reduced output in order to minimize the effect of vibrations from a trembling hand.

FIG. 10D depicts dead-zone-adjusted output ranges of the axis components. Here, the range of −30 to 30 corresponds to the dead zone. The adjustment part 130 adds 30 to the signal value C for conversion to a signal value D (=120). If the signal value C is negative, the adjustment part 130 adds −30 to the signal value C for conversion to the signal value D. In this manner, the adjustment part 130 determines whether the dead-zone-related signal portion to be added is to be positive or negative depending on whether the signal value C is positive or negative. In the case where the signal value C is zero, the adjustment part 130 does not perform the process of adding the dead-zone-related signal portion.

Incidentally, in the case where the dead zone is set to be circular around the center position of the right analog stick 77a as depicted in FIG. 7C, the dead-zone-related value to be added to the motion operation signal varies depending on the X and Y axis components of the motion operation signal.

Figures 11, 12:
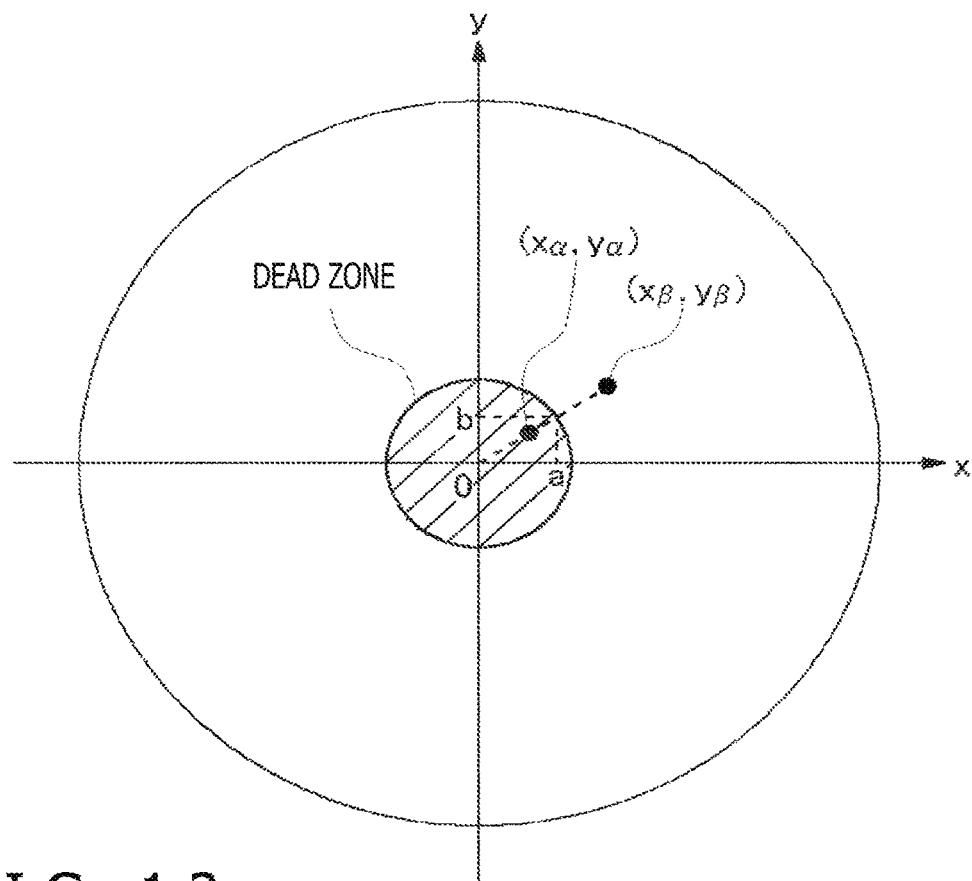
FIG. 11 is a schematic view explaining an adjusting process.
FIG. 12 is a tabular view explaining a rounding process.

FIG. 11 is a schematic view explaining the adjusting process performed by the adjustment part 130. The adjustment part 130 adds the dead-zone-related signal portion to a motion operation signal (xα, yα) to which the conversion curve is applied in the direction in which the angle (Arctan (yα/xα)) is maintained.

In the case where the dead zone is set to be circular, the adjustment part 130 obtains an intersection point (a, b)

between a straight line extending from the origin and passing through (xα, yα) on the one hand and the boundary of the dead zone on the other hand. Here, the value "a" denotes the dead-zone-related signal portion of the X axis component, and the value "b" represents the dead-zone-related signal portion of the Y axis component. The adjustment part 130 then adds the dead-zone-related signal portion (a, b) to the motion operation signal (xα, yα) to generate a motion operation signal (xβ, yβ) in which the dead-zone signal value is adjusted. Here, xβ=xα+a and yβ=yα+b. When the adjustment part 130 generates the motion operation signal to which the dead-zone signal portion is added, with the angle of the motion operation signal (xα, yα) kept unchanged, it is possible to perform viewpoint movement without giving the user a feeling of discomfort.

The motion operation signal in which the dead zone is adjusted is supplied to the analog stick signal generating part 132. The analog stick signal generating part 132 generates from the motion operation signal an operation signal of the right analog stick 77a.

FIG. 10E depicts how an analog stick signal is generated from the motion operation signal. Because the analog stick signal takes a signal value from 0 to 255, the analog stick signal generating part 132 performs the process of adjusting the output range indicated in FIG. 10D to the output range of the analog stick signal.

Since the center position of the right analog stick 77a is 128, the analog stick signal generating part 132 adds 128 to the signal value depicted in FIG. 10D to generate the analog stick signal. The analog stick signal generating part 132 adds 128 to the signal value D to generate a signal value E (=248) of the operation signal of the right analog stick 77a.

If the value obtained as a result of adding 128 to the signal value is smaller than zero, the analog stick signal generating part 132 sets the resulting signal value to 0; if the signal value thus obtained is larger than 255, the analog stick signal generating part 132 sets the resulting signal value to 255. That is, any signal values outside the range of 0 to 255 are set to either 0 or 255.

Also, because the analog stick signal takes an integer value from 0 to 255, the analog stick signal generating part 132 performs the process of rounding the motion operation signal value to which the value of 128 has been added so as to provide conversion to an integer value.

FIG. 12 is a tabular view explaining the rounding process. In the case where the game is generating game screens at 60 fps, the analog stick signal generating part 132 performs the rounding process in the frame generation cycle, i.e., at intervals of 1/60 second.

The "signal value" in the tabular view denotes the current signal value obtained by adding 128 to the motion operation signal. The "signal value to which the preceding rounding error is added" is the signal value obtained by adding the rounding error from the preceding rounding process to the "signal value." The "signal value after the rounding process" is the signal value obtained by the current process of rounding the "signal value to which the preceding rounding error is added" to the nearest decimal point. The "rounding error" is the difference between the "signal value to which the preceding rounding error is added" and the "signal value after the rounding process." This is the rounding error from the current rounding process.

When the rounding error from an N-th rounding process is 0.4, the analog stick signal generating part 132 in an (N+1)th rounding process adds the preceding rounding error (0.4) to the current signal value (125.3). By performing the rounding process in this manner, the analog stick signal generating part 132 generates the operation signal value (126) of the right analog stick 77a. As a result of this, the rounding error from the (N+1)th rounding process is −0.3.

In an (N+2)th rounding process, the analog stick signal generating part 132 adds the preceding rounding error (−0.3) to the current signal value (132.6). By performing the rounding process, the analog stick signal generating part 132 generates the operation signal value (132) of the right analog stick 77a. As a result, the rounding error from the (N+2)th rounding process is 0.3.

As described above, the analog stick signal generating part 132 adds the rounding error from the rounding process on the preceding motion operation signal to the current motion operation signal, before carrying out the rounding process. By performing the rounding process in this manner, the analog stick signal generating part 132 causes the preceding rounding error to be included in the current operation signal of the right analog stick 77a. This makes it possible to generate an operation signal of the right analog stick 77a reflecting highly accurately the motion of the second controller 12 made by the user. The analog stick signal generating part 132 supplies the generated operation signal of the right analog stick 77a to the output processing part 160. The output processing part 160 provides the operation signal of the right analog stick 77a to the game.

In this embodiment, the conversion processing part 110 converts the motion operation signal to the analog stick signal, thereby controlling the timing of conversion as desired. For example, in the case where the game is generating screens at 60 fps, the conversion processing part 110 may set the cycle of the conversion timing to 1/60 second. Alternatively, the conversion processing part 110 may convert the motion operation signal to the analog stick signal in accordance with the timing at which the game requests the operation signal.

<Process of Conversion to Input Part Operation Signals>

Explained below is the process of conversion to the operation signals of input parts other than the right analog stick 77a. The conversion processing part 110 converts the detected values of the motion sensors 195 acquired by the sensor signal acquiring part 106 into the operation signals of the input parts on the first controller 6. The output processing part 160 provides the converted operation signals to the game.

With regard to the process of conversion to the input part operation signals, the setting file 200 has descriptions of the corresponding relations between predetermined motions of the second controller 12 on the one hand and the input parts of the first controller 6 on the other hand.

FIG. 13 depicts the corresponding relations between the motions of the second controller 12 on the one hand and the input parts of the first controller 6 on the other hand. The "character's action" column in this table describes the game character's actions during the game for the purpose of explanation. These descriptions, however, need not be included in the setting file 200 because they need only be grasped on the part of the game.

For example, the top row in this correspondence table indicates that rolling the second controller 12 in the forward rotation direction corresponds to an input operation on the square button 74 of the first controller 6. Whether or not each motion has occurred is determined by the operation signal generating part 140 in the conversion processing part 110. Of these motions, "ROTATE," "TILT_UP," "MOVE_UP," and "MOVE_FORWARD" are each determined to have occurred or not by the operation signal generating part 140 using the detected values of the motion sensors 195 acquired by the sensor signal acquiring part 106. Meanwhile, whether or not the "AIM" motion has occurred is determined by the operation signal generating part 140 using the captured image acquired by the captured image acquiring part 108.

FIG. 14 is a graphic representation explaining the method for the operation signal generating part 140 to detect a motion. The operation signal generating part 140 monitors the detected values of the motion sensors 195 regarding a predetermined rotation direction or axial direction. The detected values monitored here include the angular velocity around the roll axis in the forward rotation direction for the "ROTATE" motion, the angular velocity around the pitch axis in the forward rotation direction for the "TILT_UP" motion, the acceleration on the yaw axis in the positive direction for the "MOVE_UP" motion, and the acceleration on the roll axis in the negative direction for the "MOVE_FORWARD" motion.

Motion threshold values are set here by which to determine whether the angular velocity around the roll axis in the forward rotation direction, the angular velocity around the pitch axis in the forward rotation direction, the acceleration on the yaw axis in the positive direction, and the acceleration on the roll axis in the negative direction under monitoring have each occurred. These motion threshold values may preferably be described in the setting file 200 as well. As illustrated in FIG. 14, when the detected value from the motion sensors 195 being monitored exceeds a motion threshold value, the operation signal generating part 140 determines that a motion has occurred, and generates the operation signal of the corresponding input part. For example, in the case where the sensor value indicated in FIG. 14 denotes the angular velocity around the roll axis in the forward rotation direction, the operation signal generating part 140 generates the operation signal of the square button 74 between time t1 and time t2, and supplies the generated operation signal to the output processing part 160. In this manner, the user can input commands to the game by moving the second controller 12.

Incidentally, the multiple motions of the second controller 12 may be prioritized for detection. For example, the above-described four motions may be detected in descending order of priority as follows:

"TILT_UP">"ROTATE">"MOVE_FORWARD">"MOVE_UP"

The motions are prioritized depending on the corresponding game character in action.

The operation signal generating part 140 generates the operation signals of the input parts of the first controller 6 in accordance with the priorities set for the multiple motions of the second controller 12. Specifically, during detection of a motion of a high priority and during elapse of a predetermined time period (e.g., 500 milliseconds) after completion of the detection, the operation signal generating part 140 stops detecting any motion of the lower priorities. Prioritizing the motions in this manner averts situations where multiple motions are simultaneously detected to make the game character act on multiple commands at the same time.

The motion threshold values are set so as not to be exceeded by the corresponding sensor values while the user is normally using the second controller 12. This is intended to prevent the operation signal generating part 140 from inadvertently detecting any motion when the user has no intention of causing the second controller 12 to execute any motion. That is, the motion threshold values are set in such a manner that only when the user moves the second controller 12 quickly in a predetermined rotation direction or axial direction, does the operation signal generating part 140 detect the corresponding motion.

As described above, given the motion operation signals derived from the angular velocity around the yaw axis, from the angular velocity around the pitch axis, and from the acceleration in the pitch axis direction, the analog stick signal generating part 132 in the conversion processing part 110 generates the signals of the right analog stick 77a for use in character viewpoint manipulation. If the game character's viewpoint is moved when the user causes the second controller 12 to do a certain motion, there occurs the problem of making subsequent game operations difficult to perform because the game screen being output to the output apparatus 4 is changed. In order to avert such needless viewpoint movement, the analog stick signal generating part 132 may stop outputting the analog stick operation signal to the output processing part 160 when the detected value from the motion sensors 195 exceeds a stop threshold value smaller than the motion threshold value.

FIG. 15 is another graphic representation explaining the method for the operation signal generating part 140 to detect a motion. As illustrated, the stop threshold value by which to stop the output of the analog stick signal from the analog stick signal generating part 132 is set to be smaller than the motion threshold value. The settings cause the analog stick signal generating part 132 to stop supplying the analog stick signal to the output processing part 160 as long as the sensor value is exceeding the stop threshold value. This prevents the game character's viewpoint movement during the game, allowing the user to play the game with no distraction.

Incidentally, the analog stick signal generating part 132 may supply the output processing part 160 with the generated analog stick signal multiplied by an attenuation coefficient indicated in the drawing. The attenuation coefficient is set in such a manner that the analog stick signal is gradually increased after the sensor value drops below the stop threshold value. Here, the attenuation coefficient is set to increase from 0 to 1 gradually over a period of 500 milliseconds after the sensor value drops below the stop threshold value. The settings enable the analog stick signal generating part 132 to output to the output processing part 160 an analog stick signal that is gradually increased from the time the analog stick signal is allowed to be output. This makes it possible to achieve the game character's smooth viewpoint movement.

Explained below is the method for the operation signal generating part 140 to determine whether or not an "AIM" motion has occurred. As described above, the operation signal generating part 140 detects the "AIM" motion using the captured image acquired by the captured image acquiring part 108.

Figure 16:
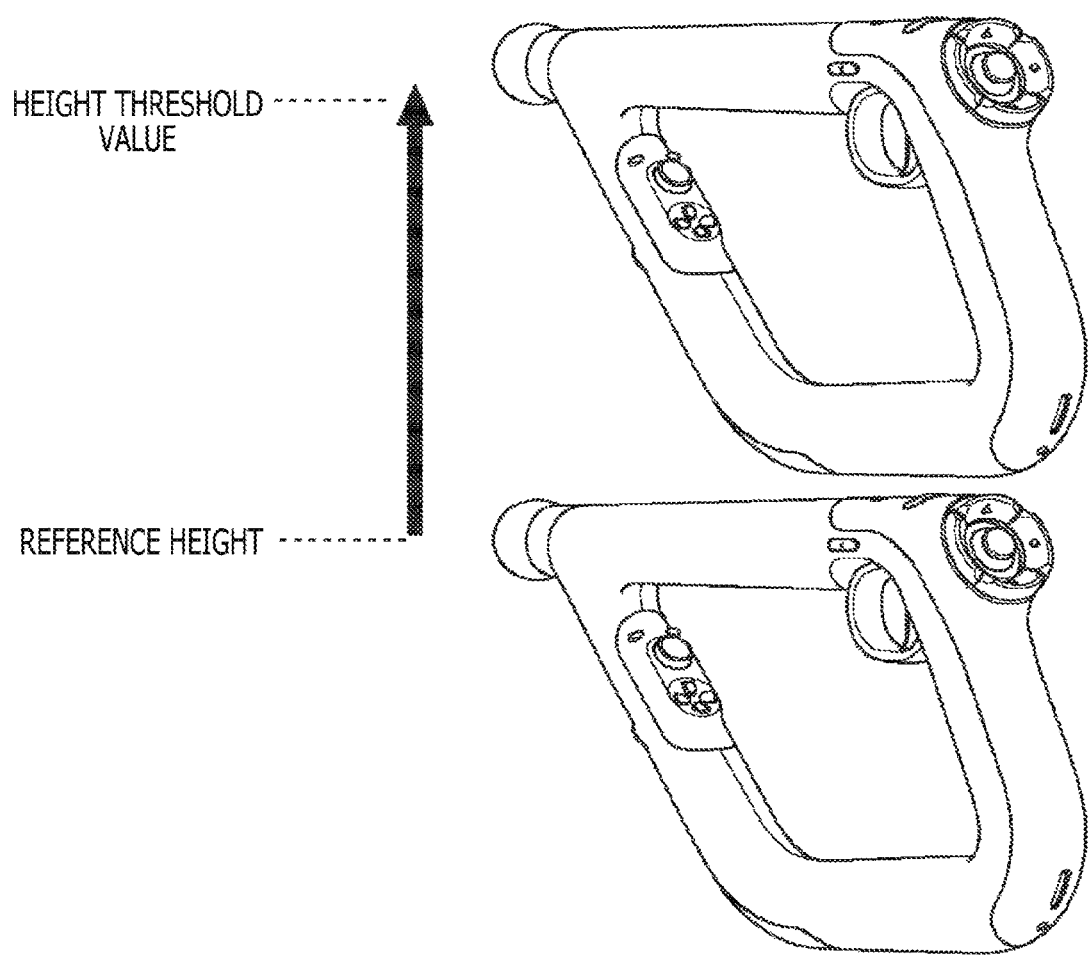
FIG. 16 is a schematic view explaining the method of detecting an "AIM" motion.

FIG. 16 is a schematic view explaining the method for the operation signal generating part 140 to detect an "AIM" motion. The operation signal generating part 140 determines whether or not an "AIM" motion has occurred in accordance with how high the light-emitting part 185 of the second controller 12 is, the height being found in the captured image. Here, a reference height of the light-emitting part 185 is defined before the game is started. Whenever the light-emitting part 185 is moved higher than the reference height by at least a predetermined height threshold value, the operation signal generating part 140 detects an "AIM" motion. It has been explained above that the reference direction for generating the analog stick signal is determined by the user pointing the second controller 12 at the output apparatus 4 and operating a predetermined button before the start of the game. At that point, the reference height may be determined at the same time.

Incidentally, the "AIM" motion is a triggering action for aiming through a scope. On the actual battlefield, a soldier holds the gun against his or her cheek to look into the scope. In the case where the user is required to perform similar actions in the game world, the "AIM" motion may be detected when, for example, the operation signal generating part 140 verifies from the captured image that the light-emitting part 185 is close to the user's face. The operation signal generating part 140 may detect the "AIM" motion when the distance between the user's face and the light-emitting part 185 is shorter than a predetermined length, for example. Upon detection of the "AIM" motion, the operation signal generating part 140 supplies the operation signal of the L2 button 84b to the output processing part 160.

In the above-described embodiment, the conversion processing part 110 converts the detected values of the motion sensors 195 into the operation signals of the input parts on the first controller 6 during games that are incapable of processing the detected values of the motion sensors 195 on the second controller 12. The system software of the information processing apparatus 10 may query the game as to whether it is capable of processing the detected values of the motion sensors 195. In the case where the game is incapable of such processing, the system software may activate the module of the conversion processing part 110 and supply the detected values of the motion sensors 195 to the conversion processing part 110.

Incidentally, some gun shooting games are designed to stage the gun muzzle jumping on recoil at the time of firing and dropping to its initial position after the firing. Because the aim is off the target if the gun muzzle jumps on recoil, the user tries to keep aim at the target by practicing the technique of pointing the right analog stick 77a downward to prevent the gun muzzle from jumping while firing the gun (called recoil control). It is assumed hereunder that the target in the game is in the horizontal direction for the purpose of explanation.

While firing the gun using the second controller 12 serving as a gun controller, the user may gradually tilt the second controller 12 downward (in the negative rotation direction around the pitch axis) for recoil control. This prevents the gun muzzle from jumping on recoil and helps keep aim in the horizontal direction. As a result, as along as the user keeps firing the gun, the user tilts the second controller 12 more and more downward in order to keep aim horizontally. Thus after the user fired the gun and tilted the downward-pointing second controller 12 up to its initial attitude (horizontal attitude), the gun muzzle in the game may turn out to be pointed upward by the amount of tilt-up from its horizontal state.

In this embodiment, when the user tilts the second controller 12 downward while pulling the R2 button 184a serving as a trigger switch, the operation signal generating part 140 determines that the user is performing recoil control. For example, when the second controller 12 is tilted down by equal to or more than a predetermined angle while the R2 button 184a is being pulled, the operation signal generating part 140 may determine that recoil control is being carried out. At the end of the shooting (i.e., after releasing the R2 button 184a), the user returns the downward-pointing second controller 12 to its initial attitude (horizontal state). At this point, the analog stick signal generating part 132 does not send to the output processing part 160 an analog stick signal corresponding to the action of tilting up the second controller 12 to make up for the amount of its tilt-down stemming from recoil control. That is, in the case where the second controller 12 is tilted relatively upward to make up for the amount of its tilt-down caused by recoil control (so as to bring the downward-pointing attitude to the initial horizontal attitude), the analog stick signal generating part 132 does not output to the output processing part 160 the analog stick signal representing the amount of the relative upward tilt. This allows the gun in the game to maintain its horizontal state because even after the second controller 12 is brought back to the initial horizontal attitude from its downward-pointing state following recoil control, the analog stick signal corresponding to the tilt-up action is not sent to the game.

The present disclosure has been described above in conjunction with a specific embodiment. It is to be understood by those skilled in the art that suitable combinations of constituent elements and various processes of the embodiment described above as an example will lead to further variations of the present disclosure and that such variations also fall within the scope of this disclosure.

With this embodiment, it has been explained that the conversion processing part 110 converts the detected values of the motion sensors 195 on the second controller 12 into the operation signals of the input parts. However, the conversion processing part 110 is not functionally limited to converting the detected values of the motion sensors 195; the conversion processing part 110 need only have the function of converting the detected values representing the motions of the second controller 12 into the operation signals of the input parts. The conversion processing part 110 may obtain the detected values representing the motions of the second controller 12 from, for example, a captured image acquired of the second controller 12 by the camera 7 and convert the detected values into the operation signals of the input parts.

What is claimed is:

1. An information processing apparatus that provides controller information to a game application running on the information processing apparatus, where the game application is designed to receive operation signals from a first type of controller, the information processing apparatus comprising:
   an acquisition part configured to acquire detected values of motion from a second type of controller, where the detected values of motion are not compatible with the operation signals of the first type of controller;
   a conversion processing part configured to convert the acquired detected values from the second type of controller to be compatible with the operation signals of the first type of controller; and
   an output processing part configured to provide the converted operation signal to the game application,
   wherein the conversion processing part includes an operation signal generating part configured such that when the detected value of a motion sensor on the controller in a predetermined rotation direction or in a predetermined axial direction exceeds a motion threshold value, the operation signal generating part generates the operation signal of an input part of the controller corresponding to the direction.

2. The information processing apparatus according to claim 1, wherein the operation signal generating part generates the operation signal of the input part of the controller in accordance with priorities set for a plurality of motions of the controller.

3. The information processing apparatus according to claim 2, wherein, during detection of a motion of a high priority, the operation signal generating part stops detecting any motion of the lower priorities.

4. The information processing apparatus according to claim 1,
wherein the conversion processing part includes an analog stick signal generating part configured to generate an operation signal of an analog stick for use in viewpoint manipulation, and
when the detected value of the motion sensor exceeds a stop threshold value smaller than the motion threshold value, the analog stick signal generating part stops outputting the operation signal of the analog stick.

5. The information processing apparatus according to claim 1, wherein the conversion processing part converts the detected value of the motion sensor of the controller to the operation signal of the input part of the controller for the game incapable of processing the detected value of the motion sensor.

6. An operation signal providing method for providing controller information to a game application running on an information processing apparatus, where the game application is designed to receive operation signals from a first type of controller, the method comprising:
acquiring detected values of motion from a second type of controller, where the detected values of motion are not compatible with the operation signals of the first type of controller;
converting the acquired detected values from the second type of controller to be compatible with the operation signals of the first type of controller; and
providing the converted operation signal to the game application,
wherein the converting includes signal generating such that when the detected value of a motion sensor on the controller in a predetermined rotation direction or in a predetermined axial direction exceeds a motion threshold value, the signal generating generates the operation signal of an input part of the controller corresponding to the direction.

7. A non-transitory, computer-readable storage medium containing a program, which when executed by an information processing apparatus, provides controller information to a game application running on the information processing apparatus, where the game application is designed to receive operation signals from a first type of controller, by carrying out actions, comprising:
acquiring detected values of motion from a second type of controller, where the detected values of motion are not compatible with the operation signals of the first type of controller;
converting the acquired detected values from the second type of controller to be compatible with the operation signals of the first type of controller; and
providing the converted operation signal to the game application,
wherein the converting includes signal generating such that when the detected value of a motion sensor on the controller in a predetermined rotation direction or in a predetermined axial direction exceeds a motion threshold value, the signal generating generates the operation signal of an input part of the controller corresponding to the direction.

* * * * *